United States Patent
Li et al.

(10) Patent No.: US 11,018,496 B2
(45) Date of Patent: May 25, 2021

(54) LEAKAGE CURRENT DETECTION AND PROTECTION DEVICE, AND POWER CONNECTOR AND ELECTRICAL APPLIANCE EMPLOYING THE SAME

(71) Applicant: Chengli Li, Suzhou (CN)

(72) Inventors: Chengli Li, Suzhou (CN); Long Chen, Suzhou (CN); Shengyun Nie, Suzhou (CN)

(73) Assignee: Chengli Li, Suzhou (CN)

( * ) Notice: Subject to any disclaimer, the term of this patent is extended or adjusted under 35 U.S.C. 154(b) by 91 days.

(21) Appl. No.: 16/653,457

(22) Filed: Oct. 15, 2019

(65) Prior Publication Data

US 2021/0111554 A1  Apr. 15, 2021

(30) Foreign Application Priority Data

Oct. 10, 2019  (CN) .......................... 201910957936.6
Oct. 10, 2019  (CN) .......................... 201921690901.2

(51) Int. Cl.
*H02H 3/00* (2006.01)
*H02H 7/20* (2006.01)
*H02H 1/00* (2006.01)
*H01R 13/713* (2006.01)

(52) U.S. Cl.
CPC ............ *H02H 7/20* (2013.01); *H01R 13/713* (2013.01); *H02H 1/0007* (2013.01); *H02H 1/0092* (2013.01)

(58) Field of Classification Search
None
See application file for complete search history.

(56) References Cited

U.S. PATENT DOCUMENTS

| 8,436,739 | B2* | 5/2013 | Elms .................. G01R 31/3272 340/638 |
| 9,312,680 | B2* | 4/2016 | Li .......................... H02H 5/047 |
| 9,906,014 | B2* | 2/2018 | Gao ....................... G01R 31/50 |

* cited by examiner

*Primary Examiner* — Stephen W Jackson
(74) *Attorney, Agent, or Firm* — Chen Yoshimura LLP (57) ABSTRACT

A leakage current detection and protection device, and power connector and electrical appliance employing the same. The device includes: a leakage current detection module which detects a leakage current on the power lines to generate a leakage fault signal; a self-test module which periodically generates a simulated leakage current and outputs a self-test fault signal when the leakage current detection module is faulty; a trip module, including a switch coupled between the input and output ends of the power lines, and a first trip coil which drives the switch; a drive module which drives the trip module to disconnect the electrical connection between the input and output ends in response to the leakage fault signal and/or the self-test fault signal; and a trip function detection module which generates a trip coil fault signal in response to detecting an open circuit in the first trip coil to disconnect the electrical connection.

23 Claims, 5 Drawing Sheets

Figure 5

LEAKAGE CURRENT DETECTION AND PROTECTION DEVICE, AND POWER CONNECTOR AND ELECTRICAL APPLIANCE EMPLOYING THE SAME

BACKGROUND OF THE INVENTION

Field of the Invention

This invention relates to electrical appliances, and in particular, it relates to a leakage current detection and protection device with self-test function, as well as power connector and electrical appliance employing the same.

Description of Related Art

With the increased awareness of safety in the use of electrical appliances, leakage current detection and protection device are becoming widely used. To enhance the leakage current detection and protection functions, self-test functions are incorporated into such devices, so that when the protection function of the leakage current detection and protection device is lost, no power will be output, which enhances the safety of the device. Current leakage current detection and protection device with self-test functions still has some problems. For example, key components of the leakage current detection and protection device such as trip coil and drive device may develop problems after long-term use. In particular, the enameled wires of the trip coil are thin, and are often subject to high working temperatures, so they are prong to damage (e.g., open circuit). This will cause the leakage current detection and protection device to lose its protection function and become unable to interrupt the power output, presenting a safety threat.

SUMMARY

Accordingly, the present invention is directed to a leakage current detection and protection device which employs an additional trip coil, so that when one trip coil is damaged (e.g. open circuit), the leakage current detection and protection device can still function to interrupt the power output.

To achieve the above objects, the present invention provides a leakage current detection and protection device coupled between an input end and an output end of power lines, the device including: a leakage current detection module configured to detect a leakage current signal on the power lines and to generate a leakage fault signal in response to detecting the leakage current signal; a self-test module configured to periodically generate a simulated leakage current signal and to output a self-test fault signal when the leakage current detection module is faulty; a trip module, which includes a switch coupled between the input and output ends of the power lines, and a first trip coil configured to drive the switch to control electrical connection and disconnection between the input and output ends; a drive module configured to drive the trip module to disconnect the electrical connection between the input and output ends in response to the leakage fault signal and/or the self-test fault signal; and a trip function detection module configured to generate a trip coil fault signal in response to detecting an open circuit in the first trip coil and to disconnect the electrical connection.

In one embodiment, the trip function detection module includes a second trip coil; and a first semiconductor device, having its first electrode coupled to one of the power lines at the input end, its second electrode coupled to the second trip coil, and its control electrode coupled to the trip coil fault signal, wherein the first semiconductor device is configured to, in response to the trip coil fault signal, operate the second trip coil to drive the switch to disconnect the electrical connection between the input end and the output end.

In one embodiment, the trip function detection module further includes: a second semiconductor device, having its control electrode coupled to the first trip coil, its first electrode coupled to the control electrode of the first semiconductor device to provide the trip coil fault signal to the first semiconductor device, and its second electrode coupled to a ground.

In one embodiment, the first electrode of the second semiconductor device is coupled to the control electrode of the first semiconductor device via a first diode and/or a first resistor.

In one embodiment, the drive module further includes: a third semiconductor device, having its first electrode coupled to the first trip coil, its second electrode coupled to the ground, and its control electrode coupled to the leakage fault signal and/or the self-test fault signal.

In one embodiment, the trip function detection module further includes: a fourth semiconductor device, having its first electrode coupled to the second trip coil, its second electrode coupled to the ground, and its control electrode coupled to the first electrode of the second semiconductor device to receive the trip coil fault signal, wherein the first trip coil and the second trip coil are coupled in series, and the first semiconductor device and the first trip coil are coupled in parallel.

In one embodiment, the control electrode of the third semiconductor device is coupled to the leakage fault signal via a first resistor-capacitor filter circuit, and is coupled to the control electrode of the fourth semiconductor device via a second resistor-capacitor filter circuit, and wherein the control electrode of the fourth semiconductor device is coupled to the leakage fault signal and the self-test fault signal via the second resistor-capacitor filter circuit, and wherein a time constant of the first resistor-capacitor filter circuit is greater than a time constant of the second resistor-capacitor filter circuit. In such embodiment, when the third semiconductor device is faulty or open circuit, the fourth semiconductor device can become conductive in response to the leakage fault signal, so that the first and second trip coils drive the switch to disconnect the power lines. When the third semiconductor device is shorted, the first trip coil drives the switch to disconnect the power lines. When the third semiconductor device is functioning normally, because the time constant of the first resistor-capacitor filter circuit is greater than the time constant of the second resistor-capacitor filter circuit, the fourth semiconductor device is responsive to the self-test fault signal.

In one embodiment, the control electrode of the third semiconductor device is coupled to the control electrode of the fourth semiconductor device via a third diode and/or a third resistor.

In one embodiment, each of the first to fourth semiconductor devices is a silicon controlled rectifier, a bipolar junction transistor, a field-effect transistor, a photocoupler, or a relay.

In one embodiment, the leakage current detection module includes a leakage current detector coil configured to detect the leakage current, and a first processor configured to generate the leakage fault signal in response to the leakage current detector coil detecting the leakage current signal, and wherein the self-test module includes a second processor configured to generate the self-test fault signal when the leakage current detection module is faulty.

In one embodiment, the first processor and the second processor are integrated in one processor chip.

In another aspect, the present invention provides a leakage current detection and protection device coupled between an input end and an output end of power lines, the device including: a leakage current detection module configured to detect a leakage current signal on the power lines and to generate a leakage fault signal in response to detecting the leakage current signal; a self-test module configured to periodically generate a simulated leakage current signal and to output a self-test fault signal when the leakage current detection module is faulty; a switch coupled between the input and output ends of the power lines; and a drive module configured to drive the switch to disconnect the electrical connection between the input and output ends in response to the leakage fault signal and/or the self-test fault signal, wherein the drive module includes: a first trip coil, and a second trip coil, coupled in series to the first trip coil, wherein the drive module is configured to, in response to detecting a fault in one of the first and second trip coils, generate a trip coil fault signal and operate the other one of the first and second trip coils to drive the switch to disconnect the electrical connection between the input and output ends.

In one embodiment, the drive module further includes: a first semiconductor device, coupled in series with the second trip coil; a second semiconductor device, coupled in series with the second trip coil, and coupled in parallel with the first trip coil, wherein a control electrode of the second semiconductor device is coupled to the trip coil fault signal; and a third semiconductor device, coupled in series with the first trip coil, and coupled in parallel with the second trip coil, wherein respective control electrodes of the first semiconductor device and the third semiconductor device are coupled to the leakage fault signal and/or the self-test fault signal.

In one embodiment, the drive module further includes a fourth semiconductor device, having its control electrode coupled to the first trip coil, its first electrode coupled to the control electrode of the second semiconductor device to supply the trip coil fault signal, and its second electrode coupled to ground.

In one embodiment, the first electrode of the fourth semiconductor device is coupled to the control electrode of the second semiconductor device via a first diode and/or a first resistor.

In one embodiment, the control electrode of the first semiconductor device is coupled to the leakage fault signal and the self-test fault signal via a first resistor-capacitor filter circuit, wherein the control electrode of the third semiconductor device is coupled to the leakage fault signal and the self-test fault signal via a second resistor-capacitor filter circuit, and wherein a time constant of the first resistor-capacitor filter circuit is greater than a time constant of the second resistor-capacitor filter circuit.

In one embodiment, the leakage current detection module includes a leakage current detector coil configured to detect the leakage current, and a first processor configured to generate the leakage fault signal in response to the leakage current detector coil detecting the leakage current signal, and wherein the self-test module includes a second processor configured to generate the self-test fault signal when the leakage current detection module is faulty.

In one embodiment, the first processor and the second processor are integrated in one processor chip.

In one embodiment, each of the first to fourth semiconductor devices is a silicon controlled rectifier, a bipolar junction transistor, a field-effect transistor, a photocoupler, or a relay.

In another aspect, the present invention provides a power connector, which includes a shell, and the leakage current detection and protection device according to any one of the above embodiments disposed in the shell.

In another aspect, the present invention provides an electrical appliance, which includes an electrical load, and a power connector coupled between the electrical load and a power source, configured to supply power to the electrical load, wherein the power connector includes the leakage current detection and protection device according to any one of the above embodiments.

The leakage current detection and protection device according to embodiments of the present invention has the advantage that even when the trip coil in the device is faulty, the device can still trip in response to current leakage, which improves safety.

BRIEF DESCRIPTION OF THE DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF PREFERRED EMBODIMENTS

Embodiments of the present invention are described below with reference to the drawings. These drawings and descriptions explain embodiments the invention but do not limit the invention. Other embodiments are possible without departing from the spirit and scope of the invention. Various modification and variations can be made in both the structure and the working principle of the device. Thus, it is intended that the scope of the invention is defined by the appended claims.

Some terms are defined here. A transistor may be of any type and structure, such as field-effect transistor (FET)

including metal-oxide-semiconductor field-effect transistor (MOSFET), bipolar junction transistor (BJT), silicon controlled rectifier (SCR), etc. When the transistor is a FET, the control electrode refers to the gate of the FET, the first electrode may be the drain or source of the FET, and the corresponding second electrode may be the source or drain of the FET. When the transistor is a BJT, the control electrode refers to the base of the BJT, the first electrode may be the collector or emitter of the BJT, and the corresponding second electrode may be the emitter or collector of the BJT. When the transistor is an SCR, the control electrode refers to the control electrode G of the SCR, the first electrode may be the anode, and the corresponding second electrode may be the cathode. A simulated leakage current signal is a periodic signal generated by the self-test module. Because it has a relatively short duration, although the leakage current detection module can detect the simulated leakage current signal, it will not cause the device to trip and interrupt the power connection. A real leakage current signal is a non-periodic signal present on the power lines. Because it lasts a relatively long time, when there is a real leakage current signal, the device trips and interrupts the power connection.

Embodiments of the present invention provide a leakage current detection and protection device having a self-test function; the device has an additional trip coil so that when one trip coil is damaged (e.g. becoming an open circuit), the leakage current detection and protection device can still interrupt the power connection.

Figure 1:
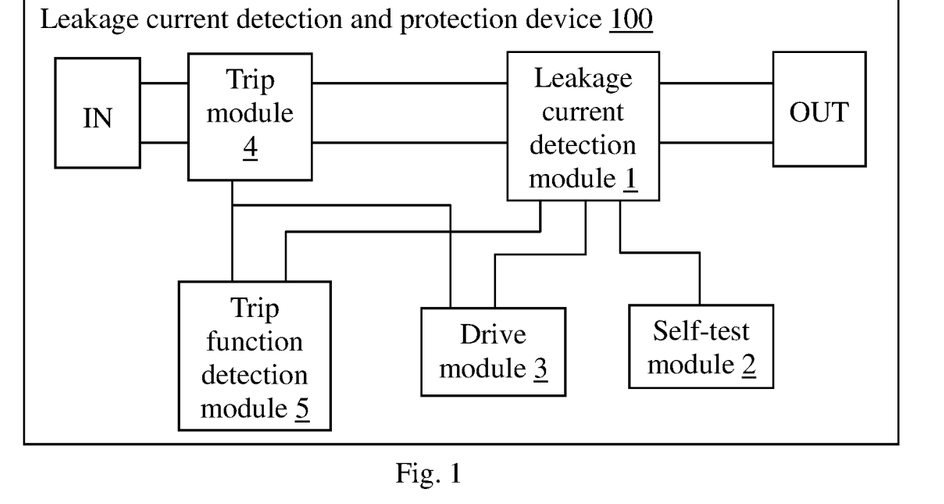
FIG. 1 is a block diagram of a leakage current detection and protection device according to embodiments of the present invention.

FIG. 1 is a block diagram of a leakage current detection and protection device according to embodiments of the present invention in response to detecting a leakage current.

As shown in FIG. 1, the leakage current detection and protection device 100 includes a leakage current detection module 1, a self-test module 2, a drive module 3, and a trip module 4. The leakage current detection module 1 is coupled to the power lines to detect a leakage current on the power lines. When a leakage current is detected, the leakage current detection module 1 generates a leakage fault signal (i.e. a signal indicating that a current leakage is present) for the drive module 3. The self-test module 2 is coupled to the power lines and the leakage current detection module 1, and periodically generates a simulated leakage current signal, to detect whether the leakage current detection module 1 is faulty. When the leakage current detection module 1 is faulty, the self-test module 2 generates a self-test fault signal (i.e. a signal indicating that the self-test module 2 is faulty) to the drive module 3. The drive module 3 controls the trip module 4 in response to the leakage fault signal or the self-test fault signal. The trip module 4 is coupled on the power lines between the input end IN and the output end OUT, and controls the connection between the input end and output end in response to the signal provided by the drive module 3. A trip function detection module 5 is coupled to the power lines and the trip module 4, to detect whether the trip module 4 is functioning normally. When the trip function detection module 5 detects that a first trip coil in the trip module 4 is faulty, it generates a trip coil fault signal (i.e. a signal indicating that the trip coil is faulty), which causes the trip module 4 to disconnect the power connection.

Figure 2:
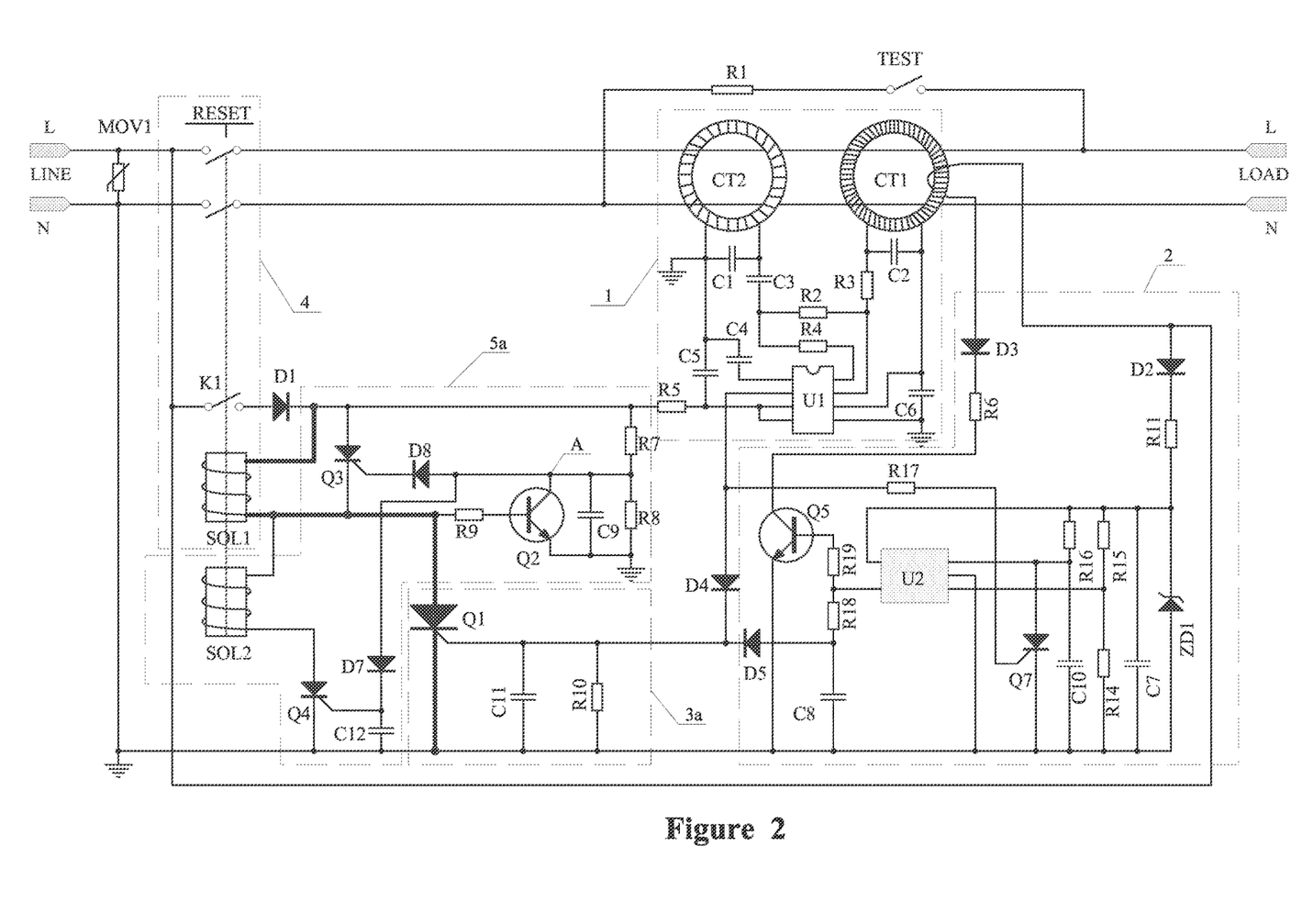
FIG. 2 is a circuit diagram of a leakage current detection and protection device according to a first embodiment of the present invention.
Figure 3:
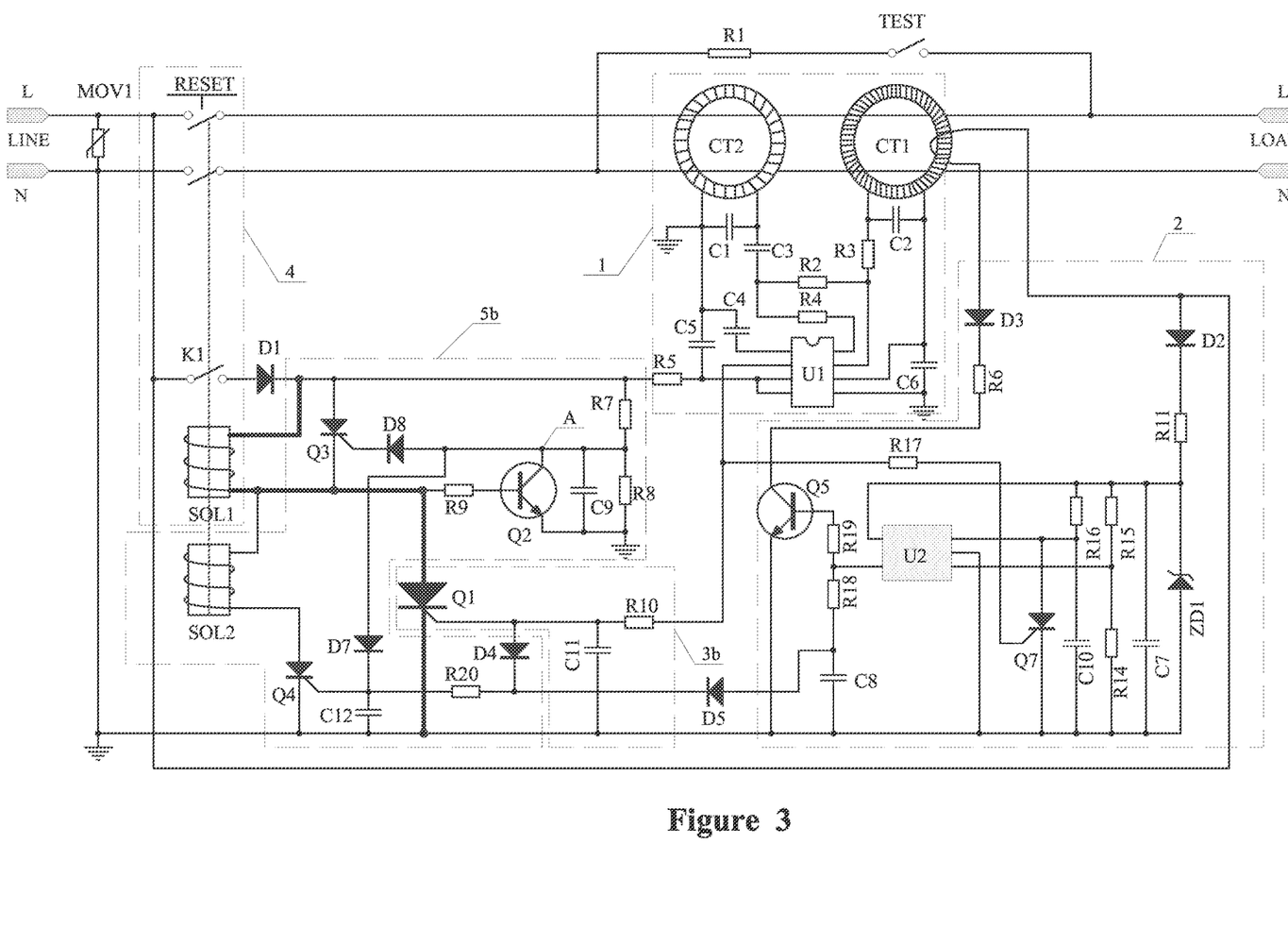
FIG. 3 is a circuit diagram of a leakage current detection and protection device according to a second embodiment of the present invention.
Figure 4:
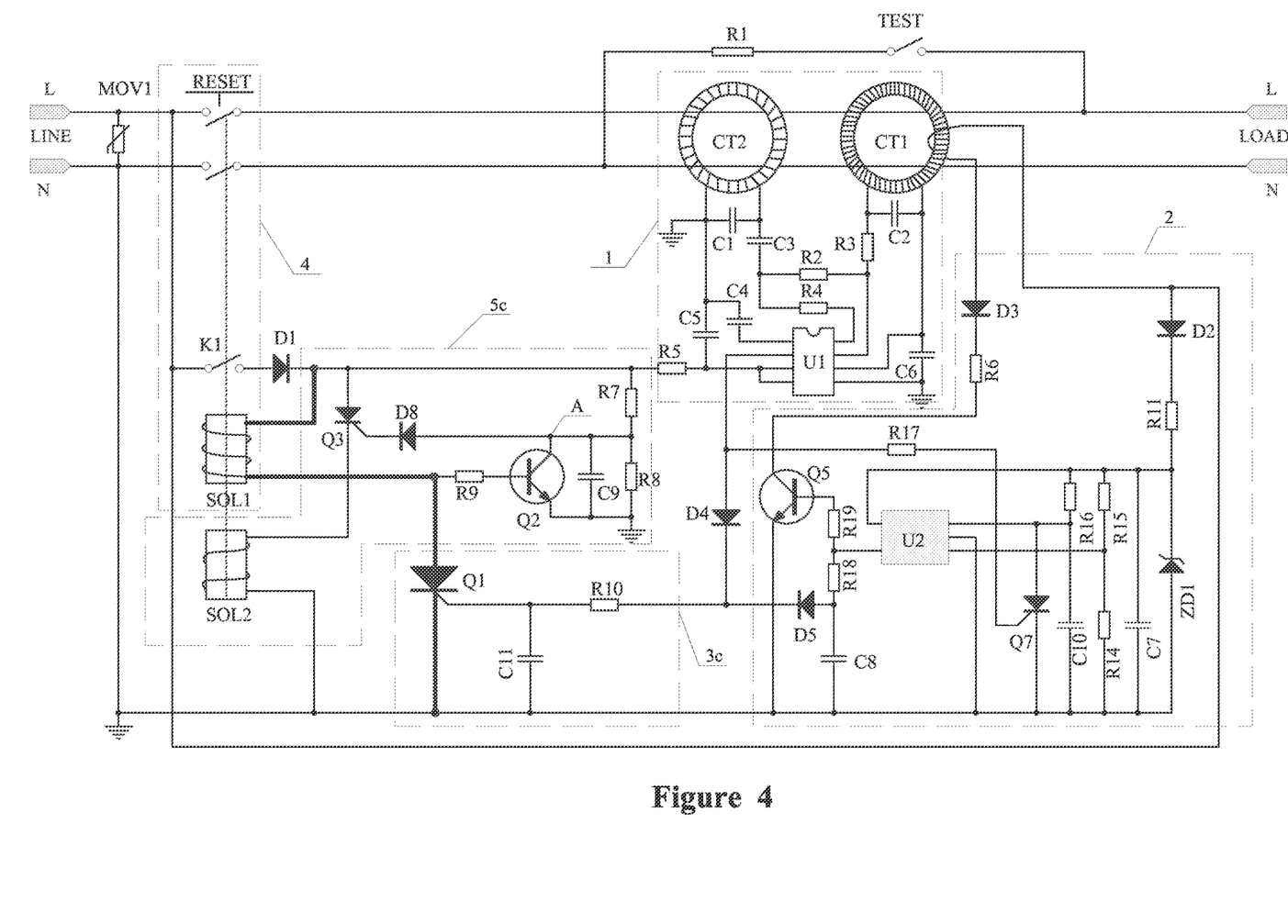
FIG. 4 is a circuit diagram of a leakage current detection and protection device according to a third embodiment of the present invention.
Figure 5:
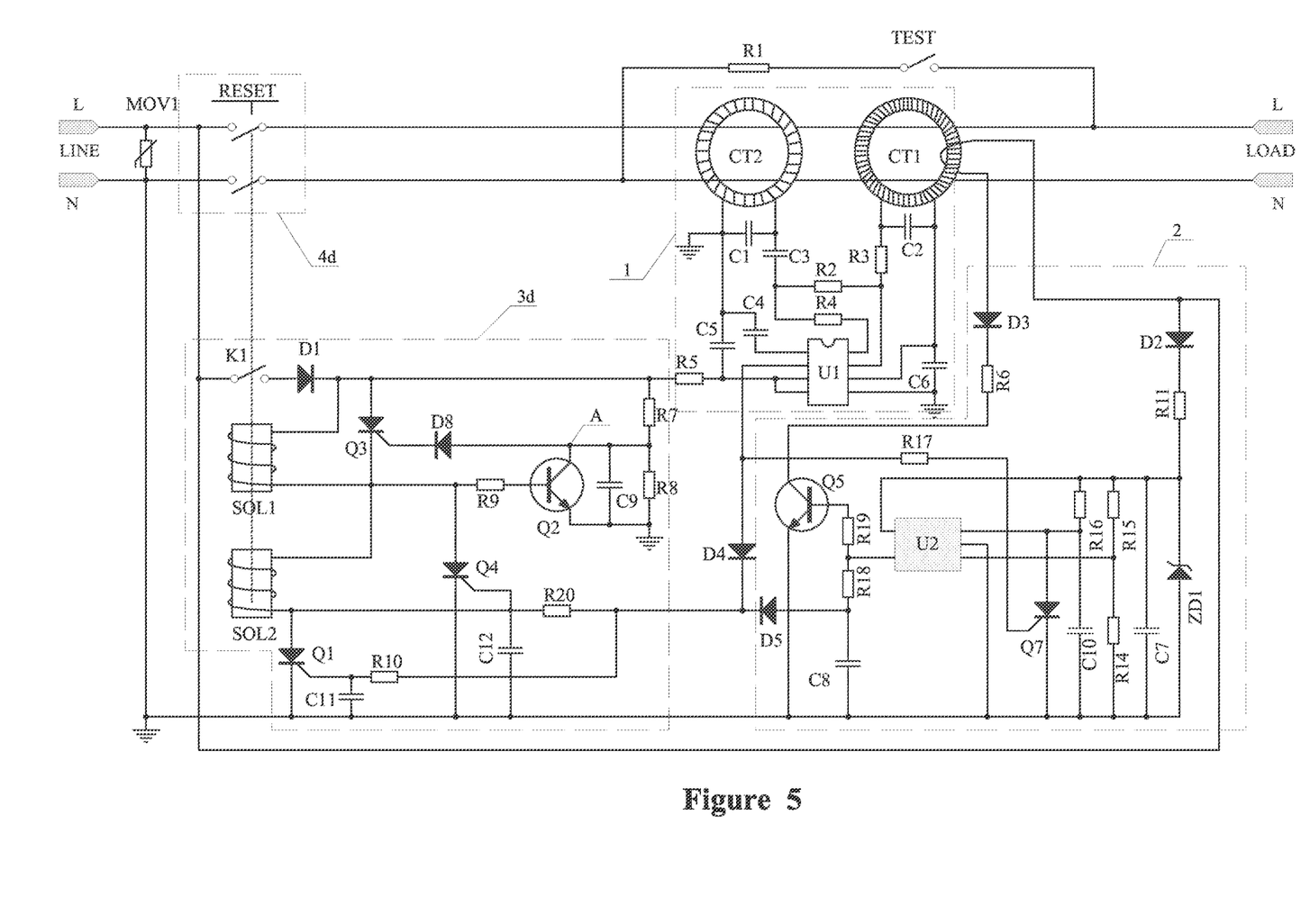
FIG. 5 is a circuit diagram of a leakage current detection and protection device according to a fourth embodiment of the present invention.

In FIGS. 2, 3, 4 and 5, the drive modules are respectively designated by reference symbols 3a, 3b, 3c and 3d; in FIGS. 2, 3 and 4, the trip function detection modules are respectively designated by reference symbols 5a, 5b, and 5c; in FIG. 5, the trip module is designated by reference symbol 4d.

FIG. 2 is a circuit diagram of a leakage current detection and protection device according to a first embodiment of the present invention.

As shown in FIG. 2, the leakage current detection module 1 includes two leakage current detector coils CT1 and CT2 which are coupled to the power lines L, N, and processor U1. When the detector coils CT1 and CT2 detect a leakage current signal, processor U1 generates a leakage fault signal. Here, it should be understood that the leakage current signal may be a real leakage current signal indicating current leakage on the power lines, or a simulated leakage current signal generated by the self-test module 2.

The trip module 4 includes a reset switch RESET (e.g. a mechanical switch) and a first solenoid (trip coil) SOL1. The reset switch RESET operates to disconnect or connect the electrical connection between the input end (LINE) and the output end (LOAD), and the first solenoid SOL1 controls the switching operation of the reset switch RESET.

The trip function detection module 5a includes a second solenoid (trip coil) SOL2 and at least one transistor coupled in series with the second solenoid SOL2. When the first solenoid SOL1 is faulty (i.e., forming an open circuit), the second solenoid SOL2 operates, so as to disconnect the electrical connection between the input end and the output end. In other words, when the first solenoid SOL1 is not functioning properly, the second solenoid SOL2 can still function. More specifically, the first transistor Q3 is coupled in series with the second solenoid SOL2, and also coupled in parallel with the first solenoid SOL1; the second solenoid SOL2 is coupled in series with the first solenoid SOL1 and coupled to ground via transistor Q4. Thus, when the first solenoid SOL1 is faulty, by controlling the states of transistors Q3 and Q4, a current can be made to flow through the second solenoid SOL2, which opens the reset switch RESET.

Transistor Q2 has its control electrode coupled to the first solenoid SOL1, its first electrode coupled to the control electrodes of transistors Q3 and Q4, and its second electrode coupled to ground. More specifically, the first electrode of transistor Q2 is coupled to the control electrode of transistor Q3 via diode D8, and coupled to the control electrode of transistor Q4 via diode D7. It should be understood that the first electrode of transistor Q2 may alternatively be coupled to the control electrode of transistor Q3 via diode D8 and/or a resistor, and coupled to the control electrode of transistor Q4 via diode D7 and/or a resistor. When switch K1 is closed, the control electrode of transistor Q2 is coupled to the hot line L at the input end via resistor R9 and the first solenoid SOL1, so that the point A (first electrode of transistor Q2) is at a low voltage, and transistors Q3, Q4 are in a non-conducting state.

The self-test module 2 includes processor U2 and transistor Q7, and operates to periodically generate a simulated leakage current signal. More specifically, when the hot line L of the input end provides power, resistor R16 of the self-test module 2 charges capacitor C10, and when the voltage on capacitor C10 is above a predefined level, processor U2 outputs a high voltage signal to cause transistor Q5 to be conductive. In another embodiment, processor U2 may receive the voltage signals on capacitor C10 and resistor R14, and encode these voltage signals to generate an output signal that controls transistor Q5. After transistor Q5 becomes conductive, detector coil CT1 detects the simulated leakage current signal, which causes processor U1 to output a leakage fault signal.

The leakage fault signal is respectively coupled to transistor Q7 of the self-test module 2 and transistor Q1 of the drive module 3a. A sub-circuit (e.g., resistor-capacitor filter circuit including resistor R10 and capacitor C11) may be provided to ensure that the voltage rise speed of the control electrode of transistor Q1 is slower than the voltage rise speed of the control electrode of transistor Q7. When transistor Q7 becomes conductive (and transistor Q1 is not yet conductive), transistor Q7 continues to discharge capacitor C10, so that processor U2 outputs a low voltage signal to cause transistor Q5 to become non-conductive. Thus, the simulated leakage current to the leakage current detection module 1 stops. When resistor R16 of the self-test module 2 again starts to charge capacitor C10, the next periodic self-test starts. When a component of the self-test process is faulty, so that the output signal of processor U2 cannot flip, processor U2 will continue to output a high voltage signal (i.e. a self-test fault signal); this voltage charges capacitor C11 via diode D5, to generate a control signal for transistor Q1. It should be understood that the above-described sub-circuit can include, in addition to a resistor and a capacitor, other active or passive electrical components.

In some embodiments, processor U1 and processor U2 may be integrated in one processor chip, which can simplify the circuit structure, lower power consumption, and reduce the size of the device.

The operations of the leakage current detection and protection device of FIG. 2 are described below.

When the reset switch RESET is depressed, the power connection is connected and the device works normally to provide power at the output end.

When the leakage current detection module 1 outputs a leakage fault signal (caused by the real leakage current signal) via diode D4, or when the self-test module 2 outputs a self-test fault signal via diode D5, transistor Q1 becomes conductive, forming a current loop L-K1-D1-SOL1-Q1-N. Thus, solenoid SOL1 generates a magnetic field to drive the reset switch RESET to trip, thereby disconnecting the power between the input and output ends to ensure safety.

When no real leakage current signal nor self-test fault signal are not present, if solenoid SOL1 becomes an open circuit, the control electrode of transistor Q2 loses signal, so transistor Q2 becomes non-conductive, and the voltage at point A rises (which constitutes a trip coil fault signal). This signal is respectively applied to the control electors of transistor Q3 and transistor Q4 via diode D8 and diode D7 to cause these transistors to become conductive, forming a current loop L-K1-D1-Q3-SOL2-Q4-N. Thus, solenoid SOL2 generates a magnetic field to drive the reset switch RESET to trip, thereby disconnecting the power between the input and output ends. At this time, if the reset switch RESET is depressed again repeatedly, the leakage current detection and protection device will repeatedly trip, so that power cannot be output at the output end.

FIG. 3 is a circuit diagram of a leakage current detection and protection device according to a second embodiment of the present invention.

The circuit of FIG. 3 is similar to the circuit of FIG. 2, but the control electrodes of transistor Q4 and transistor Q1 are coupled together (e.g., via diode D4 and resistor R20), and the self-test fault signal outputted by the self-test module 2 via diode D5 is coupled to transistor Q4 rather than transistor Q1.

The operations of the leakage current detection and protection device of FIG. 3 are described below.

When the reset switch RESET is depressed, the power connection is connected and the device works normally to provide power at the output end.

When a real leakage current is present, the leakage current detection module 1 outputs a leakage fault signal. Due to the timing characteristics of a filter circuit (e.g. a resistor-capacitor circuit R10 and C11) that is coupled to the control electrode of transistor Q1 and a filter circuit (e.g. a resistor-capacitor circuit R20 and C12) that is coupled to the control electrode of transistor Q4, transistor Q1 becomes conductive in response to the leakage fault signal earlier than transistor Q4, to form a current loop L-K1-D1-SOL1-Q1-N. Thus, solenoid SOL1 generates a magnetic field to drive the reset switch RESET to trip, thereby disconnecting the power between the input and output ends.

When the periodic self-test process cannot be completed (e.g., when the leakage current detection function is lost), processor U2 of the self-test module 2 continues to output a high voltage signal, and outputs a self-test fault signal via diode D5, so that transistor Q4 become conductive to form a current loop L-K1-D1-SOL1-SOL2-Q4-N. Thus, solenoid SOL1 and solenoid SOL2 generate magnetic fields to drive the reset switch RESET to trip, thereby disconnecting the power between the input and output ends.

When solenoid SOL1 becomes an open circuit, the control electrode of transistor Q2 loses signal, so transistor Q2 becomes non-conductive, and the voltage at point A rises. This voltage signal is respectively applied to the control electors of transistor Q3 and transistor Q4 via diode D8 and diode D7 to cause these transistors to become conductive, forming a current loop L-K1-D1-Q3-SOL2-Q4-N. Thus, solenoid SOL2 generates a magnetic field to drive the reset switch RESET to trip, thereby disconnecting the power between the input and output ends.

When transistor Q1 is faulty (e.g., an open circuit), if the leakage current detection module 1 outputs leakage fault signal, diode D4 and resistor 20 charges capacitor C12, causing transistor Q4 to become conductive, forming a current loop L-K1-D1-SOL1-SOL2-Q4-N. Thus, solenoid SOL1 and solenoid SOL2 generate magnetic fields to drive the reset switch RESET to trip, thereby disconnecting the power between the input and output ends.

When transistor Q1 is a short circuit, a current loop L-K1-D1-SOL1-N is formed, and solenoid SOL1 generates a magnetic field to drive the reset switch RESET to trip, thereby disconnecting the power between the input and output ends.

In this embodiment, even when transistor Q1 is an open circuit or a short circuit, solenoid SOL1 and/or solenoid SOL2 can drive the reset switch RESET to trip. When transistor Q1 functions normally, because the time constant of filter circuit (R10, C11) that is coupled to the control electrode of transistor Q1 is greater than that of the filter circuit (R20, C12) that is coupled to the control electrode of transistor Q4, transistor Q4 is responsive to the self-test fault signal.

FIG. 4 is a circuit diagram of a leakage current detection and protection device according to a third embodiment of the present invention.

This circuit is similar to the circuits of FIG. 2, with the following main differences. As shown in FIG. 4, transistor Q4 is eliminated. One end of the second solenoid SOL2 is coupled to the power input (and not in series with SOL1), and transistor Q3 is coupled in series with the second solenoid SOL2. The control electrode of transistor Q2 is coupled to the first solenoid SOL1 (and not to the power input). Similar to FIGS. 2 and 3, the first electrode of transistor Q2 is coupled to the power input and transistor Q3 and the second electrode of transistor Q2 is coupled to ground. It should be understood that transistor Q2 may alternatively be coupled to transistor Q3 via diode D8 and/or a resistor.

The operations of the leakage current detection and protection device of FIG. 4 are described below.

When the reset switch RESET is depressed, the power connection is connected and the device works normally to provide power at the output end.

When the leakage current detection module 1 outputs a leakage fault signal (caused by the real leakage current signal) via diode D4, or when the self-test module 2 outputs a self-test fault signal via diode D5, transistor Q1 becomes conductive, forming a current loop L-K1-D1-SOL1-Q1-N. Thus, solenoid SOL1 generates a magnetic field to drive the reset switch RESET to trip, thereby disconnecting the power between the input and output ends.

When solenoid SOL1 becomes an open circuit, the control electrode of transistor Q2 loses signal, so transistor Q2 becomes non-conductive, and the voltage at point A rises. This voltage signal is applied to the control electors of transistor Q3 via diode D8 to cause transistor Q3 to become conductive, forming a current loop L-K1-D1-Q3-SOL2-N. Thus, solenoid SOL2 generates a magnetic field to drive the reset switch RESET to trip, thereby disconnecting the power between the input and output ends.

FIG. 5 is a circuit diagram of a leakage current detection and protection device according to a fourth embodiment of the present invention.

As shown in FIG. 5, unlike the first to third embodiments (FIGS. 2-4), the leakage current detection and protection device of the fourth embodiment does not have a trip function detection module 5. The first solenoid SOL1 is not a part of the trip module 4d (which includes the reset switch RESET), but a part of the drive module 3d; the two solenoids SOL1 and SOL2 can separately or jointly control the trip module 4d. Transistor Q3 is coupled in parallel with the first solenoid SOL1, and transistor Q4 is coupled in parallel with the serially coupled second solenoid SOL2 and transistor Q1. Thus, when solenoid SOL1 is faulty, transistor Q3 becomes conductive, which causes solenoid SOL2 to trip the reset switch RESET.

The operations of the leakage current detection and protection device of FIG. 5 are described below.

When the reset switch RESET is depressed, the power connection is connected and the device works normally to provide power at the output end.

When the leakage current detection module 1 outputs a leakage fault signal (caused by the real leakage current signal) via diode D4, or when the self-test module 2 outputs a self-test fault signal via diode D5, due to the timing characteristics of the filter circuit (R10, C11) that is coupled to the control electrode of transistor Q1 and the filter circuit (R20, C12) that is coupled to the control electrode of transistor Q4, transistor Q1 becomes conductive earlier than transistor Q4, to form a current loop L-K1-D1-SOL1-SOL2-Q1-N. Thus, solenoid SOL1 and solenoid SOL2 generate magnetic fields to drive the reset switch RESET to trip, thereby disconnecting the power between the input and output ends.

When solenoid SOL1 is an open circuit, the control electrode of transistor Q2 loses signal, so transistor Q2 becomes non-conductive, and the voltage at point A rises. This voltage signal is applied to the control electors of transistor Q3 via diode D8 to cause transistor Q3 to become conductive. If a leakage fault signal and/or self-test fault signal is present at this time, a current loop L-K1-D1-Q3-SOL2-Q1-N is formed. Thus, solenoid SOL2 generates a magnetic field to drive the reset switch RESET to trip, thereby disconnecting the power between the input and output ends.

When solenoid SOL2 is an open circuit, if a leakage fault signal and/or self-test fault signal is present at this time, a high voltage signal is continuously supplied to the control electrodes of transistor Q1 and transistor Q4. Because solenoid SOL2 is an open circuit, a current loop L-K1-D1-SOL1-Q4-N is formed. Thus, solenoid SOL1 generates a magnetic field to drive the reset switch RESET to trip, thereby disconnecting the power between the input and output ends.

Similarly, when transistor Q1 is an open circuit, if a leakage fault signal and/or self-test fault signal is present at this time, a current loop L-K1-D1-SOL1-Q4-N is formed. Thus, solenoid SOL1 generates a magnetic field to drive the reset switch RESET to trip, thereby disconnecting the power between the input and output ends.

When transistor Q1 is a short circuit, a current loop L-K1-D1-SOL1-SOL2-N is formed, and solenoid SOL1 and solenoid SOL2 generate magnetic fields to drive the reset switch RESET to trip, thereby disconnecting the power between the input and output ends.

In the above descriptions, transistors are used as examples, but the transistors may be replaced by other semiconductor devices, such as photocouplers, relays, or other controllable switch devices.

Figure 6A:
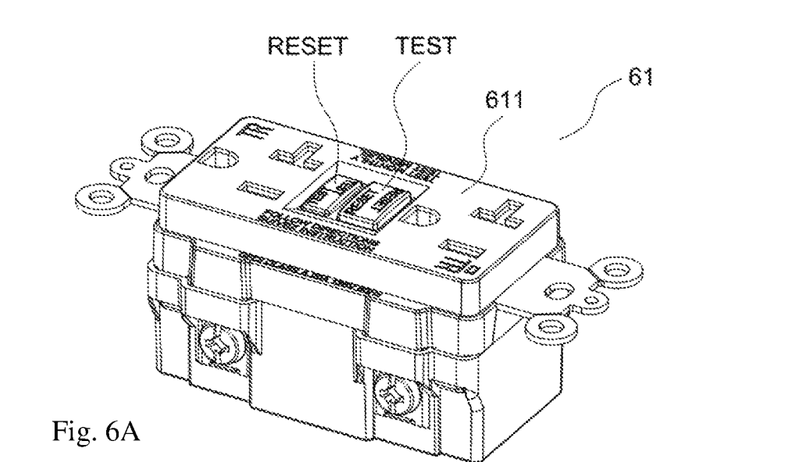
FIG. 6A illustrates a power connector according to an embodiment of the present invention.
Figure 6B:
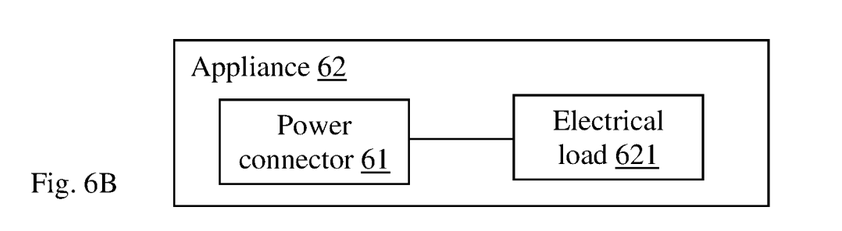
FIG. 6B is a block diagram of an electrical appliance according to an embodiment of the present invention.

FIGS. 6A and 6B respectively illustrate a power connector and an electrical appliance according to embodiments of the present invention.

As shown in FIGS. 6A and 6B, the power connector 61 includes a shell 611 and a leakage current detection and protection device (not shown, but may be one of the circuits shown in FIGS. 2-5) disposed within the shell. The shell is provided with through holes for a first press button corresponding to the reset switch RESET and a second press button corresponding to the test switch TEST to pass through. The appliance 62 includes a electrical load 621 and the power connector 61. The power connector is coupled between a power source and the load to supply power to the load.

It will be apparent to those skilled in the art that various modification and variations can be made in the leakage current detection and protection device and related power connector and electrical appliance of the present invention without departing from the spirit or scope of the invention. Thus, it is intended that the present invention cover modifications and variations that come within the scope of the appended claims and their equivalents.

What is claimed is:

1. A leakage current detection and protection device coupled between an input end and an output end of power lines, the device comprising:
    a leakage current detection module configured to detect a leakage current signal on the power lines and to generate a leakage fault signal in response to detecting the leakage current signal;
    a self-test module configured to periodically generate a simulated leakage current signal and to output a self-test fault signal when the leakage current detection module is faulty;
    a trip module, including:
        a switch coupled between the input and output ends of the power lines; and
        a first trip coil configured to drive the switch to control electrical connection and disconnection between the input and output ends;

a drive module configured to drive the trip module to disconnect the electrical connection between the input and output ends in response to the leakage fault signal and/or the self-test fault signal; and a trip function detection module configured to generate a trip coil fault signal in response to detecting an open circuit in the first trip coil and to disconnect the electrical connection.

2. The leakage current detection and protection device of claim 1, wherein the trip function detection module includes:

a second trip coil; and a first semiconductor device, having its first electrode coupled to one of the power lines at the input end, its second electrode coupled to the second trip coil, and its control electrode coupled to the trip coil fault signal, wherein the first semiconductor device is configured to, in response to the trip coil fault signal, operate the second trip coil to drive the switch to disconnect the electrical connection between the input end and the output end.

3. The leakage current detection and protection device of claim 2, wherein the trip function detection module further includes:

a second semiconductor device, having its control electrode coupled to the first trip coil, its first electrode coupled to the control electrode of the first semiconductor device to provide the trip coil fault signal to the first semiconductor device, and its second electrode coupled to a ground.

4. The leakage current detection and protection device of claim 3, wherein the first electrode of the second semiconductor device is coupled to the control electrode of the first semiconductor device via a first diode and/or a first resistor.

5. The leakage current detection and protection device of claim 3, wherein the drive module further includes:

a third semiconductor device, having its first electrode coupled to the first trip coil, its second electrode coupled to the ground, and its control electrode coupled to the leakage fault signal and/or the self-test fault signal.

6. The leakage current detection and protection device of claim 5, wherein the trip function detection module further includes:

a fourth semiconductor device, having its first electrode coupled to the second trip coil, its second electrode coupled to the ground, and its control electrode coupled to the first electrode of the second semiconductor device to receive the trip coil fault signal, wherein the first trip coil and the second trip coil are coupled in series, and the first semiconductor device and the first trip coil are coupled in parallel.

7. The leakage current detection and protection device of claim 6, wherein the control electrode of the third semiconductor device is coupled to the leakage fault signal via a first resistor-capacitor filter circuit, and is coupled to the control electrode of the fourth semiconductor device via a second resistor-capacitor filter circuit, and wherein the control electrode of the fourth semiconductor device is coupled to the leakage fault signal and the self-test fault signal via the second resistor-capacitor filter circuit, and wherein a time constant of the first resistor-capacitor filter circuit is greater than a time constant of the second resistor-capacitor filter circuit.

8. The leakage current detection and protection device of claim 6, wherein the control electrode of the third semiconductor device is coupled to the control electrode of the fourth semiconductor device via a third diode and/or a third resistor.

9. The leakage current detection and protection device of claim 6, wherein each of the first to fourth semiconductor devices is a silicon controlled rectifier, a bipolar junction transistor, a field-effect transistor, a photocoupler, or a relay.

10. The leakage current detection and protection device of claim 1, wherein the leakage current detection module includes a leakage current detector coil configured to detect the leakage current, and a first processor configured to generate the leakage fault signal in response to the leakage current detector coil detecting the leakage current signal, and wherein the self-test module includes a second processor configured to generate the self-test fault signal when the leakage current detection module is faulty.

11. The leakage current detection and protection device of claim 10, wherein the first processor and the second processor are integrated in one processor chip.

12. A power connector, comprising:

a shell; and the leakage current detection and protection device of claim 1 disposed in the shell.

13. An electrical appliance, comprising:

an electrical load; and a power connector, coupled between the electrical load and a power source, configured to supply power to the electrical load, wherein the power connector includes the leakage current detection and protection device of claim 1.

14. A leakage current detection and protection device coupled between an input end and an output end of power lines, the device comprising:

a leakage current detection module configured to detect a leakage current signal on the power lines and to generate a leakage fault signal in response to detecting the leakage current signal;

a self-test module configured to periodically generate a simulated leakage current signal and to output a self-test fault signal when the leakage current detection module is faulty;

a switch coupled between the input and output ends of the power lines; and a drive module configured to drive the switch to disconnect the electrical connection between the input and output ends in response to the leakage fault signal and/or the self-test fault signal, wherein the drive module includes:

a first trip coil; and a second trip coil, coupled in series to the first trip coil, wherein the drive module is configured to, in response to detecting a fault in one of the first and second trip coils, generate a trip coil fault signal and operate the other one of the first and second trip coils to drive the switch to disconnect the electrical connection between the input and output ends.

15. The leakage current detection and protection device of claim 14, wherein the drive module further includes:

a first semiconductor device, coupled in series with the second trip coil;

a second semiconductor device, coupled in series with the second trip coil, and coupled in parallel with the first trip coil, wherein a control electrode of the second semiconductor device is coupled to the trip coil fault signal; and a third semiconductor device, coupled in series with the first trip coil, and coupled in parallel with the second trip coil,
wherein respective control electrodes of the first semiconductor device and the third semiconductor device are coupled to the leakage fault signal and/or the self-test fault signal.

16. The leakage current detection and protection device of claim 15, wherein the drive module further includes a fourth semiconductor device, having its control electrode coupled to the first trip coil, its first electrode coupled to the control electrode of the second semiconductor device to supply the trip coil fault signal, and its second electrode coupled to ground.

17. The leakage current detection and protection device of claim 16, wherein the first electrode of the fourth semiconductor device is coupled to the control electrode of the second semiconductor device via a first diode and/or a first resistor.

18. The leakage current detection and protection device of claim 16, wherein each of the first to fourth semiconductor devices is a silicon controlled rectifier, a bipolar junction transistor, a field-effect transistor, a photocoupler, or a relay.

19. The leakage current detection and protection device of claim 15,
wherein the control electrode of the first semiconductor device is coupled to the leakage fault signal and the self-test fault signal via a first resistor-capacitor filter circuit,
wherein the control electrode of the third semiconductor device is coupled to the leakage fault signal and the self-test fault signal via a second resistor-capacitor filter circuit, and
wherein a time constant of the first resistor-capacitor filter circuit is greater than a time constant of the second resistor-capacitor filter circuit.

20. The leakage current detection and protection device of claim 14, wherein
wherein the leakage current detection module includes a leakage current detector coil configured to detect the leakage current, and a first processor configured to generate the leakage fault signal in response to the leakage current detector coil detecting the leakage current signal, and
wherein the self-test module includes a second processor configured to generate the self-test fault signal when the leakage current detection module is faulty.

21. The leakage current detection and protection device of claim 20, wherein the first processor and the second processor are integrated in one processor chip.

22. A power connector, comprising:
a shell; and
the leakage current detection and protection device of claim 14 disposed in the shell.

23. An electrical appliance, comprising:
an electrical load; and
a power connector, coupled between the electrical load and a power source, configured to supply power to the electrical load, wherein the power connector includes the leakage current detection and protection device of claim 14.

* * * * *